United States Patent
Liu

(10) Patent No.: US 12,477,447 B2
(45) Date of Patent: Nov. 18, 2025

(54) NETWORK SELECTION METHODS, ELECTRONIC DEVICE AND STORAGE MEDIUM

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 336 days.

(21) Appl. No.: 17/565,452

(22) Filed: Dec. 30, 2021

(65) Prior Publication Data

US 2022/0124610 A1    Apr. 21, 2022

Related U.S. Application Data

(63) Continuation of application No. PCT/CN2019/115813, filed on Nov. 5, 2019.

(51) Int. Cl.
*H04W 48/18* (2009.01)
*H04W 48/16* (2009.01)

(52) U.S. Cl.
CPC .......... *H04W 48/18* (2013.01); *H04W 48/16* (2013.01)

(58) Field of Classification Search
CPC ..... H04W 48/18; H04W 48/16; H04W 48/02; H04W 12/06; H04W 12/08; H04W 60/04; H04W 48/08; H04W 76/11; H04W 84/105; H04W 84/045; H04W 36/08; H04W 48/20; H04W 36/14; H04W 12/72; H04W 4/50; H04W 8/06; H04W 72/04; H04W 4/02; H04W 40/24; H04W 88/02; H04W 72/27; H04W 40/36; H04W 36/144; H04W 72/543
See application file for complete search history.

(56) References Cited

U.S. PATENT DOCUMENTS

| | | | |
|---|---|---|---|
| 2009/0086945 A1 | 4/2009 | Buchanan et al. | |
| 2021/0099924 A1* | 4/2021 | Shih | H04W 36/0061 |
| 2021/0345226 A1* | 11/2021 | Liao | H04W 48/18 |

FOREIGN PATENT DOCUMENTS

| | | |
|---|---|---|
| CN | 101365163 | 2/2009 |
| CN | 103402190 | 11/2013 |
| CN | 104284397 | 1/2015 |
| CN | 109392059 | 2/2019 |
| CN | 109729761 | 5/2019 |

(Continued)

OTHER PUBLICATIONS

Intel., "KI1,2_Update to Solution#3", 3GPP TSG SA WG2 Meeting #129BIS, S2-1813335, Nov. 26-30, 2018, pp. 1-6.

(Continued)

*Primary Examiner* — Kwasi Karikari
(74) *Attorney, Agent, or Firm* — Hodgson Russ LLP

(57) ABSTRACT

Disclosed is a network selection method, comprising: a terminal device determining, from among at least one non-public network, a non-public network to reside in; and the terminal device determining, from among at least one service provider, a service provider for providing a service. Further disclosed are the other network selection method, and electronic device and a storage medium.

18 Claims, 2 Drawing Sheets

(56) References Cited

FOREIGN PATENT DOCUMENTS

| EP | 2742670 | 6/2015 |
|---|---|---|
| WO | 2013104494 | 7/2013 |

OTHER PUBLICATIONS

Intel., "Solution for Non-public network supporting service providers", 3GPP SA WG2 Meeting #135, S2-1909555, Oct. 14-18, 2019, pp. 1-4.

"Search Report of Europe Counterpart Application, Application No. 19951870.5", issued on Jun. 1, 2022, p. 1-p. 11.

"Office Action of China Counterpart Application, Application No. 202210184036.4", with English translation thereof, Issued on Jun. 3, 2023, p. 1-p. 11.

"Office Action of Europe Counterpart Application, Application No. 19951870.5", issued on Jan. 23, 2023, p. 1-p. 9.

Office Action of China Counterpart Application, Application No. 202210184036.4, with English translation thereof, Issued on Mar. 7, 2023, pp. 1-12.

"Office Action of China Counterpart Application, Application No. 202210184036.4", with English translation thereof, issued on Sep. 23, 2023, p. 1-p. 11.

"International Search Report (Form PCT/ISA/210) of PCT/CN2019/115813," mailed on Jul. 21, 2020, with English translation thereof, pp. 1-6.

"Written Opinion of the International Searching Authority (Form PCT/ISA/237) of PCT/CN2019/115813," mailed on Jul. 21, 2020, with English translation thereof, pp. 1-8.

3GPP, "Technical Report; 3rd Generation Partnership Project; Technical Specification Group Services and System Aspects; Study on enhanced support of non-public networks (Release 17)", 3GPP TR 23.700-07 V0.3.0, Jan. 2020, pp. 1-42.

Qualcomm Incorprorated et al., "SNPN selection for access to SNPNs using credentials from an entity separate from the SNPN." 3GPP TSG-SA WG2 Meeting #143-e (e-meeting) S2-2101079, Feb. 24-Mar. 9, 2021, Elbonia, pp. 1-8.

Qualcomm Incorprorated et al., "SNPN selection for access to SNPNs using credentials from an entity separate from the SNPN." 3GPP TSG-SA WG2 Meeting #143-e (e-meeting) S2-2100267, Feb. 24-Mar. 9, 2021, Elbonia, pp. 1-8.

EPO, Communication for EP Application No. 19951870.5, Jul. 17, 2025.

* cited by examiner

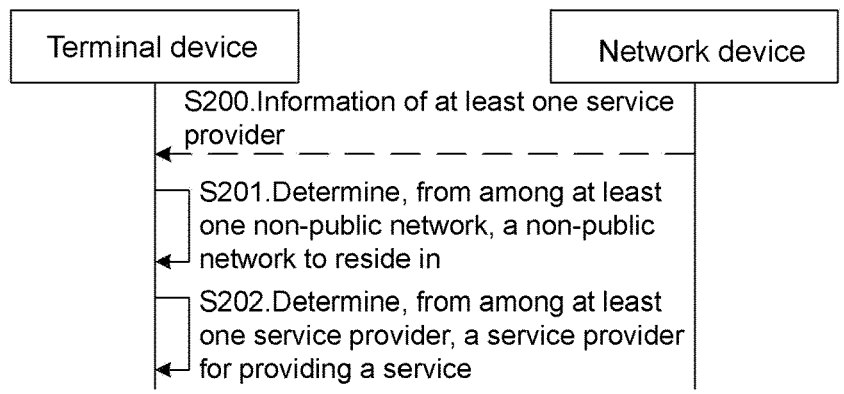

FIG.5

Send, by a network device, a system broadcast message, non-access layer signaling, or signature information to a terminal device, where the system broadcast message, the non-access layer signaling, or the signature information is configured for the terminal device to determine information of at least one service provider, and the information of the service provider is used by the terminal device to determine a non-public network to reside in and/or a service provider for providing a service — S301

FIG.6

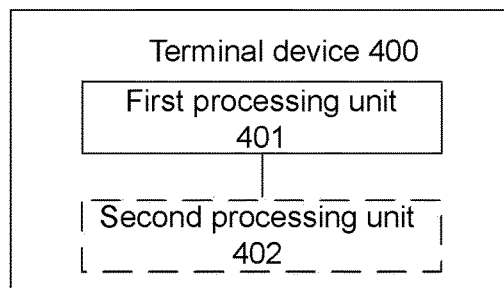

FIG.7

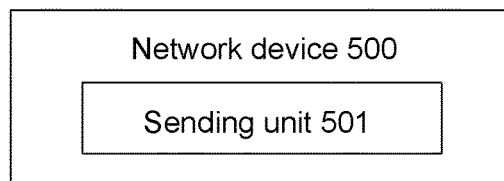

FIG.8

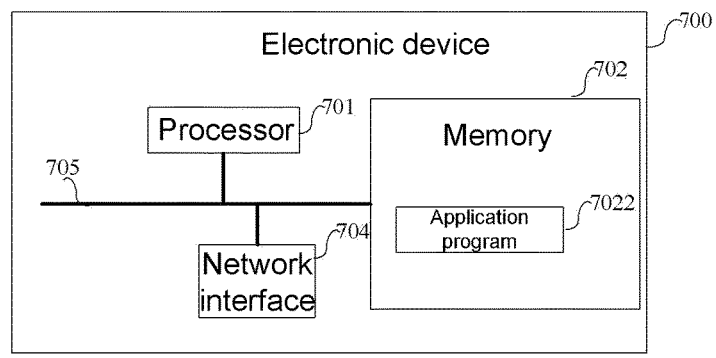

FIG.9

NETWORK SELECTION METHODS, ELECTRONIC DEVICE AND STORAGE MEDIUM

CROSS-REFERENCE TO RELATED APPLICATIONS

This application is a continuation of international PCT application serial no. PCT/CN2019/115813, filed on Nov. 5, 2019. The entirety of each of the above-mentioned patent applications is hereby incorporated by reference herein and made a part of this specification.

TECHNICAL FIELD

The disclosure relates to the field of wireless communication technology, and in particular, to network selection methods, an electronic device, and a storage medium.

DESCRIPTION OF RELATED ART

In the case that more than two non-public networks (NPNs) in which a terminal device (e.g., user equipment (UE)) can reside in are provided, or in the case that more than two service providers (SPs) that can provide traffic services for the terminal device are provided, it is not specified how the UE performs operations.

SUMMARY

To solve the foregoing technical problem, the embodiments of the disclosure provide a network selection method, a terminal device, a network device, and a storage medium capable of specifying operations of the terminal device in the case that a plurality of non-public networks to reside in and a plurality of service providers are provided.

According to the first aspect, an embodiment of the disclosure provides a network selection method, and the method includes the following steps. A terminal device, from among at least one non-public network, determines a non-public network to reside in.

The terminal device, from among at least one service provider, determines a service provider for providing a service.

According to the second aspect, the embodiments of the disclosure provides a network selection method, and the method includes the following steps. A network device sends a system broadcast message, non-access layer signaling, or signature information to a terminal device. The system broadcast message, the non-access layer signaling, or the signature information is configured for the terminal device to determine information of at least one service provider. The information of the service provider is used by the terminal device to determine a non-public network to reside in and/or a service provider for providing a service.

According to the third aspect, an embodiment of the disclosure provides a terminal device, and the first terminal device includes a first processing unit.

The first processing unit is configured to determine, from among at least one non-public network, a non-public network to reside in, and determine, from among at least one service provider, a service provider for providing a service.

According to the fourth aspect, an embodiment of the disclosure provides a network device, and the network device includes a sending unit.

The sending unit is configured to send a system broadcast message, non-access layer signaling, or signature information to a terminal device. The system broadcast message, the non-access layer signaling, or the signature information is configured for the terminal device to determine information of at least one service provider. The information of the service provider is used by the terminal device to determine a non-public network to reside in and/or a service provider for providing a service.

According to the fifth aspect, an embodiment of the disclosure provides a terminal device including a processor and a memory configured for storing a computer program that can run on the processor. The processor is configured to perform the steps of the network selection method executed by the terminal device when running the computer program.

According to the sixth aspect, an embodiment of the disclosure provides a network device including a processor and a memory configured for storing a computer program that can run on the processor. The processor is configured to perform the steps of the network selection method executed by the network device when running the computer program.

According to the seventh aspect, an embodiment of the disclosure provides a computer storage medium storing an executable program, and the executable program implements the network selection method executed by the terminal device when being executed by a processor.

According to the eighth aspect, an embodiment of the disclosure provides a computer storage medium storing an executable program, and the executable program implements the network selection method executed by the network device when being executed by a processor.

According to a ninth aspect, an embodiment of the disclosure provides a chip including a processor configured to call and run a computer program from a memory, such that a device installed with the chip executes the network selection method executed by the terminal device or the network selection method executed by the network device.

According to the tenth aspect, an embodiment of the disclosure provides a computer program product including a computer program command, and the computer program command enables a computer to execute the network selection method executed by the terminal device or the network selection method executed by the network device.

According to the eleventh aspect, an embodiment of the disclosure provides a computer program, and the computer program enables a computer to execute the network selection method executed by the terminal device or the network selection method executed by the network device.

The network selection method provided in the embodiments of the disclosure includes the following steps. A terminal device, from among at least one non-public network, determines a non-public network to reside in. The terminal device, from among at least one service provider, determines a service provider for providing a service. In this way, the operations executed by the terminal device are specified in the case that plural non-public networks to reside in and plural service providers are provided.

BRIEF DESCRIPTION OF THE DRAWINGS

FIG. 5 is a schematic diagram of an optional processing process of a network selection method applied in a terminal device provided by an embodiment of the disclosure.

FIG. 6 is a schematic chart of an optional processing process of a network selection method applied in a network device provided by an embodiment of the disclosure.

FIG. 7 is a schematic composite structure diagram of a terminal device according to an embodiment of the disclosure.

FIG. 8 is a schematic composite structure diagram of a network device according to an embodiment of the disclosure.

FIG. 9 is a schematic composite structure diagram of hardware of an electronic device according to an embodiment of the disclosure.

DESCRIPTION OF THE EMBODIMENTS

To better understand the features and technical content of the embodiments of the disclosure in detail, the implementation of the embodiments of the disclosure will be described in detail below with reference to the accompanying drawings. The accompanying drawings are provided for reference and description only, and are not used to limit the embodiments of the disclosure.

Before a network selection method provided by the embodiments of the disclosure is described in detail, a brief description of the NPN described in the related art is provided first.

In long term evolution (LTE) networks and new radio (NR) networks, public networks, that is, the public land mobile networks (PLMNs), are usually deployed. However, in some scenarios, such as office scenarios, home scenarios, factories, etc., in order to be able to perform network security management more effectively, local networks or private networks are usually deployed, and the local networks and private networks are also called NPNs.

Figure 1:
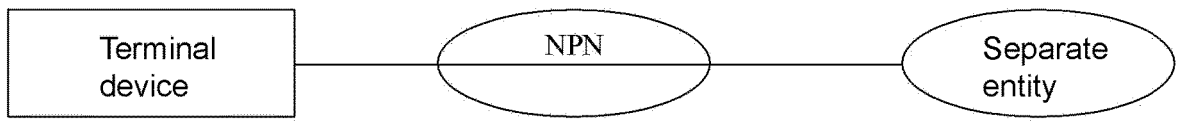
FIG. 1 is a schematic diagram of a non-public network serving another network according to the disclosure.

In one scenario, as shown in FIG. 1, one NPN may serve another network. The another network may be an SP, and the SP may also be a separate entity. The another network may further be a PLMN network, and the another network may also be a third-party subscription or certificate provider entity. In this scenario, the terminal device may discover the SP and may be connected to the SP for communication.

Figure 2:
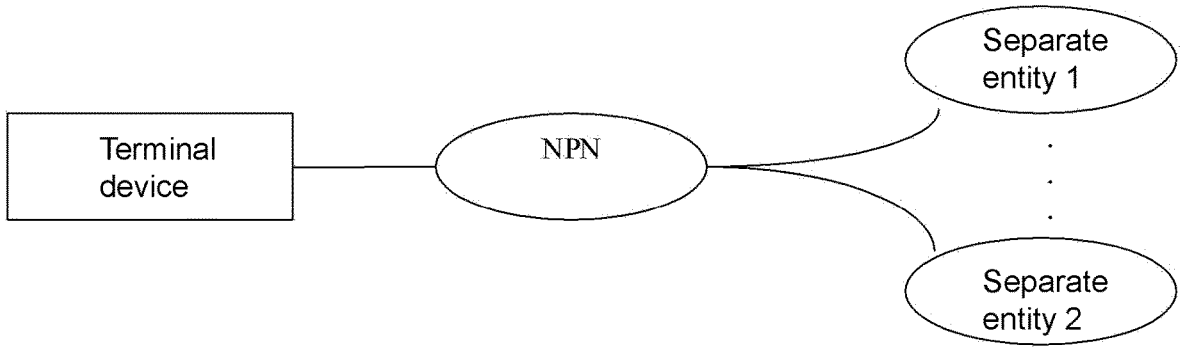
FIG. 2 is a schematic diagram of a non-public network connected to two or more separate entities according to the disclosure.

In another scenario, as shown in FIG. 2, one NPN may be connected to two or more SPs to provide multi-party services for the UE. In this scenario, the UE may discover a plurality of SPs corresponding to one NPN and needs to select one SP from among the plural SPs.

Figure 3:
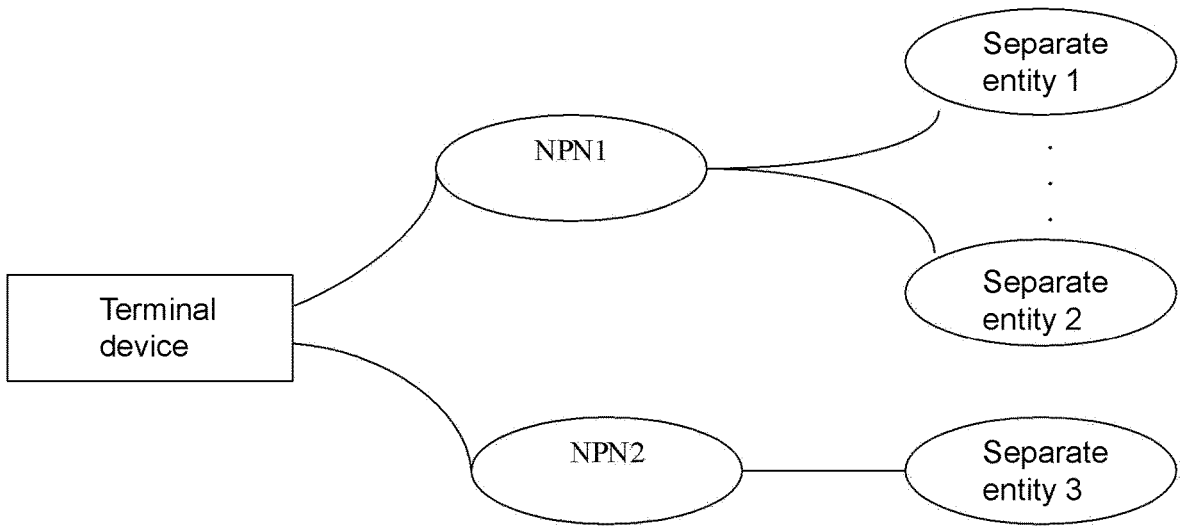
FIG. 3 is a schematic diagram of two or more non-public networks configured for a terminal device to reside in according to the disclosure.

In still another scenario, as shown in FIG. 3, two or more NPNs may be configured for the UE to reside in, and two or more NPNs may be connected to different SPs. The UE needs to discover these NPNs and the SPs corresponding to the NPNs, and the UE also needs to select one NPN among the plural NPNs to reside in and select one SP among the plural SPs.

With the pursuit of speed, latency, high-speed mobility, energy efficiency, and diversity and complexity of services in future life, the 3GPP international standards organization began the development of 5G. The main application scenarios of 5G are: enhance mobile broadband (eMBB), ultra reliable low latency communications (URLLC), and massive machine type communication (mMTC).

eMBB still aims to provide users with multimedia content, services, and data, and its demand is growing rapidly. On the other hand, since eMBB may be deployed in different scenarios, such as indoors, urban areas, rural areas, etc., its capabilities and requirements are considerably different and may not be generalized, and detailed analysis is required to be made together with specific deployment scenarios. Typical applications of URLLC include: industrial automation, power automation, telemedicine operations (surgery), traffic safety protection, etc. Typical features of mMTC include: high connection density, small data volume, delay-insensitive services, and low costs and long service life of modules.

In the early deployment of new radio (NR), it is difficult to obtain complete NR network coverage, so the typical network coverage mode is the long term evolution (LTE) coverage of wide area and the isolated island coverage mode of NR. Further, the spectrums used for LTE are mostly deployed below 6 GHz, and there are few spectrums below 6 GHz that can be used for NR. Therefore, in terms of NR, it is necessary to study the application of spectrum above 6 GHz. However, the coverage of the high frequency band is limited, and the signal fading is fast. Moreover, in order to protect the early investment of mobile operators in LTE, a working mode of tight interworking between LTE and NR is provided. Certainly, NR may also be deployed independently.

The disclosure provides a network selection method, and the network selection method provided by the embodiments of the disclosure may be applied to various communication systems, such as a global system of mobile communication (GSM) system, a code division multiple access (CDMA) system, a wideband code division multiple access (WCDMA) system, a general packet radio service (GPRS), a LTE system, a LTE frequency division duplex (FDD) system, LTE time division duplex (TDD), a universal mobile telecommunication system (UMTS), a worldwide interoperability for microwave access (WiMAX) communication system, or a 5G system and the like.

Figure 4:
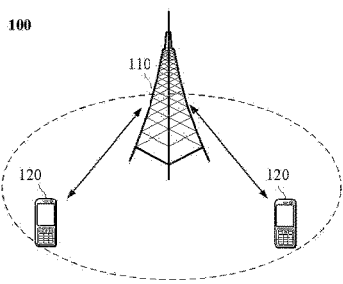
FIG. 4 is a schematic composite structure diagram of a communication system according to an embodiment of the disclosure.

Exemplarily, a communication system 100 applied in the embodiments of the disclosure is shown in FIG. 4. The communication system 100 may include a network device 110, and the network device 110 may be a device communicating with terminal devices 120 (or referred to as communication terminals or terminals). The network device 110 may provide communication coverage for a specific geographic area and may communicate with terminal devices located in this coverage area. Optionally, the network device 110 may be a base station (base transceiver station, BTS) in a GSM system or a CDMA system, a base station (NodeB, NB) in a WCDMA system, or an evolutional base station (evolutional Node B, eNB, or eNodeB) in a LTE system, or a wireless controller in a cloud radio access network (CRAN), or the network device may be a mobile switching center, a relay station, an access point, a vehicle-mounted device, a wearable device, a hub, a switch, a bridge, a router, a network side device in a 5G network, or a network device in a public land mobile network (PLMN) that evolves in the future.

The communication system 100 also includes at least one terminal device 120 located within the coverage area of the network device 110. The "terminal device" used herein includes but not limited to connection via a wired line such as via a public switched telephone network (PSTN), a digital subscriber line (DSL), a digital cable, direct cable connection, and/or another data connection/network, and/or via a wireless interface such as a cellular network, a wireless local area network (WLAN), a digital television network such as a DVB-H network, a satellite network, an AM-FM broadcast transmitter, and/or another terminal device set to receive/transmit communication signals, and/or an Internet of Things (IoT) device. The terminal device set to communicate through a wireless interface may be referred to as a "wireless communication terminal", a "wireless terminal", or a "mobile terminal". Examples of the mobile terminal include but not limited to a satellite or cellular phone; a personal communications system (PCS) terminal capable of combining a cellular radio phone with data processing, fax, and data communication capabilities, and may include a radio phone, a pager, Internet/Intranet access, a web browser, a memo pad, a calendar, and/or a PDA of a global positioning system (GPS) receiver, and a conventional laptop and/or palmtop receiver, or other electronic devices including a radio telephone transceiver. The terminal device may refer to an access terminal, user equipment (UE), a user unit, a user station, a mobile station, a mobile platform, a remote station, a remote terminal, mobile equipment, a user terminal, a terminal, a wireless communication device, a user agent, or a user device. The access terminal may be a cellular phone, a cordless phone, a session initiation protocol (SIP) phone, a wireless local loop (WLL) station, a personal digital assistant (PDA), a handheld device with wireless communication functions, a computing device or other processing devices connected to a wireless modem, a vehicle-mounted device, a wearable device, a terminal device in a 5G network, or a terminal device in a PLMN that evolves in the future.

Optionally, device to device (D2D) communication may be performed between the terminal devices 120.

Optionally, the 5G system or 5G network may also be referred to as a NR system or NR network.

FIG. 4 schematically illustrates one network device and two terminal devices, and optionally, the communication system 100 may include a plurality of network devices, and the coverage area of each network device may include other numbers of terminal devices, which is not limited in the embodiments of the disclosure.

Optionally, the communication system 100 may further include other network entities such as a network controller, a mobility management entity, etc., which are not limited in the embodiments of the disclosure.

It should be understood that a device with a communication function in the network/system in the embodiments of the disclosure may be referred to as a communication device. Taking the communication system 100 shown in FIG. 4 as an example, the communication device may include the network device 110 and the terminal devices 120 having communication functions. The network device 110 and the terminal devices 120 may be the specific devices described above, and description thereof is not repeated herein. The communication device may also include other devices in the communication system 100, such as other network entities such as a network controller and a mobility management entity, which are not limited in the embodiments of the disclosure.

An optional processing process of a network selection method applied in a terminal device provided by an embodiment of the disclosure is shown in FIG. 5, and the method includes the following steps.

In step S201, a terminal device, from among at least one non-public network, determines a non-public network to reside in.

In some embodiments, the terminal device, according to a non-public network allowed to be accessed by the terminal device, determines a non-public network to reside in.

In some embodiments, the terminal device, according to a service provider allowed to be accessed by the terminal device, determines a non-public network to reside in corresponding to the service provider allowed to be accessed.

In step S202, the terminal device, from among at least one service provider, determines a service provider for providing a service.

In some embodiments, the terminal device, according to a service provider allowed to be accessed by the terminal device, a service provider for providing a service.

In some embodiments, the terminal device, from among the at least one service provider, determines a pre-configured service provider as the service provider for providing a service.

In some embodiments, the terminal device, from among the at least one service provider, determines a service provider equivalent to the pre-configured service provider as the service provider for providing a service.

In some embodiments, the terminal device, among the at least one service provider, determines the service provider for providing a service according to selection of a terminal device user.

In the embodiments of the disclosure, the network selection method may further include the following steps.

In step S200, the terminal device determines information of the at least one service provider.

In some embodiments, the information of the service provider at least includes: a service provider identifier (SID) and/or readable name information of the service provider.

In some embodiments, the SID includes at least one or more of the following: a country or region code, an industry code, and a country or region assigned service provider code.

In some embodiments, the SID at least includes a non-public network identifier (NID) corresponding to the service provider.

In some embodiments, the terminal device, through a system broadcast message, determines the information of the at least one service provider. Alternatively, the terminal device, through non-access layer NAS signaling, determines the information of the at least one service provider. Alternatively, the terminal device, through signature information of the terminal device, determines the information of the at least one service provider.

In some embodiments, the NAS signaling at least includes: a terminal device registration acceptance message or a terminal device configuration update message.

In some embodiments, the signature information is sent by a network device on a non-public network, and the signature information carries information of a service provider that can be supported by the non-public network. In the case that the signature information is sent by the service provider, and the signature information carries information of a non-public network that can provide a service for the service provider. In the case that the signature information is sent by a network device on a non-public network, and the signature information carries information of a service provider that can be supported by the non-public network.

In the following, a processing process of the network selection method provided in the embodiments of the disclosure are described for different scenarios.

In scenario one, as shown in FIG. 1, an NPN that a terminal device can reside in is provided, and the NPN corresponds to an SP or corresponds to a separate entity.

In the scenario shown in FIG. 1, in order for the terminal device to discover the SP or the separate entity provided by the NPN, the NPN network device needs to notify the terminal device of information of the SP or information of the separate entity. In specific implementation, the NPN network device may at least notify the information of the terminal device SP or the information of the separate entity in one of the following three methods:

In method 1, the NPN network device notifies the information of the terminal device SP or the information of the separate entity through a system broadcast message. For instance, the NPN network device carries the information of the SP or the information of the separate entity for a cell in the system broadcast message of this cell. If an identifier of the NPN that can be supported by the cell is a NID (NPN identifier), the system broadcast message informs the information of the SP or the information of the separate entity that carries this NID.

In method 2, the NPN network device notifies the information of the terminal device SP or the information of the separate entity through NAS signaling. For instance, the terminal device initiates a registration process to the NPN, and the NPN network device provides the information of the SP or the information of the separate entity to the terminal device in a terminal registration acceptance message. Alternatively, the terminal device initiates a configuration update process to the NPN, and the NPN network device provides the information of the SP or the information of the separate entity to the terminal device in a terminal configuration update message. Herein, the information of the SP or the information of the separate entity may be an identifier of the SP or an identifier of the separate entity represented by the SID, or readable name information of the SP or readable name information of the separate entity.

In method 3, the terminal device is notified of the information of the SP or the information of the separate entity through the signature information. Herein, the signature information may be sent to the terminal device by an NPN network device, and the signature information may also be sent to the terminal device by the SP or the separate entity. In the case that the signature information is sent by the NPN network device to the terminal device, the signature information carries the information of the SP or the information of the separate entity that can be supported by the NPN. In the case that the signature information is sent by the SP or the separate entity to the terminal device, the signature information carries the information of the NPN that can provide a service for the SP or the separate entity.

The information of the SP or the information of the separate entity involved in the three methods may be the identifier of the SP or the identifier of the separate entity represented by the SID, the readable name information of the SP, or the readable name information of the separate entity. Herein, the SID may be a globally-managed identifier, and the SID is unique globally. In this case, the SID includes at least one or more of the following: a country or region code, an industry code, and a country or region assigned service provider code. The SID may also be the management identifier of the SP or the separate entity in this NPN, which is unique in this NPN. In this case, the SID includes at least the NID corresponding to the SP or the separate entity.

In scenario two, as shown in FIG. 2, an NPN that a terminal device can reside in is provided, and the NPN corresponds to two or more SPs or separate entities.

In the scenario shown in FIG. 2, the terminal device needs to discover the SPs or separate entities provided by the NPN, and select one SP or separate entity from the plural SPs or separate entities to provide services for the terminal device. In specific implementation, the terminal device can discover the SPs or separate entities corresponding to the NPN through the same three methods as provided in scenario one. When an access layer (AS) entity of the terminal device receives a system broadcast message, NAS signaling, or signature information that carries the information of the SP or the information of the separate entity, the AS layer entity forwards the received message to a NAS layer entity, and the NAS layer entity selects an SP or a separate entity to provide a service for the terminal device.

In some embodiments, when the NAS layer entity selects one SP or separate entity to provide a service for the terminal device, it can select a pre-configured SP or a pre-configured separate entity to provide a service for the terminal device. For instance, if the pre-configured separate entity is a separate entity 2, the terminal device selects the separate entity 2 to provide a service for the terminal device. The SP or separate entity equivalent to the pre-configured SP or pre-configured separate entity may also be selected to provide a service for the terminal device. For instance, if the pre-configured separate entity is a separate entity 3 and the separate entity 2 is equivalent to the separate entity 3, the terminal device selects the separate entity 2 to provide a service for the terminal device. One SP or separate entity may also be determined to provide a service for the terminal device according further to selection made by a terminal device user. For instance, if the terminal device user selects a separate entity 1, the terminal device determines that the separate entity 1 provides a service for the terminal device.

In some other embodiments, the NAS layer entity may also determine one SP or separate entity for providing a service according to the SP or separate entity allowed to be accessed by the terminal device. For instance, if the separate entity allowed to be accessed by the terminal device is the separate entity 1, the terminal device selects the separate entity 1 to provide a service for the terminal device.

In scenario three, as shown in FIG. 3, two or more NPNs that a terminal device can reside in are provided, and each NPN corresponds to one or more SPs or separate entities.

The terminal device needs to discover the NPNs that the terminal device can reside in and the SPs or separate entities provided by these NPNs, selects one NPN to reside in from among the multiple NPNs, and selects one SP or separate entity from among the multiple SPs or separate entities to provide services for the terminal device.

The terminal device needs to select an NPN to reside in. In specific implementation, the terminal device may determine an NPN to reside in according to the NPN allowed to be accessed by the terminal device. For instance, if the NPN allowed to be accessed by the terminal device is NPN1, the terminal device may only select NPN1 to reside in. The terminal device may also make NPN selection according to the separate entity allowed to be accessed. For instance, if the separate entity allowed to be accessed by the terminal device is the separate entity 3 and the separate entity 3 corresponds to NPN2, the terminal device may select NPN2 to reside in.

The terminal device also needs to select a separate entity. When the terminal device selects NPN1, since the separate entities corresponding to NPN1 are the separate entity 1 and separate entity 2, the terminal device needs to select one of the separate entity 1 and separate entity 2 to serve the terminal device. The processing procedure for the terminal device to select the separate entity is the same as the processing procedure for the terminal device to select the separate entity in the above scenario two, and description thereof is not repeated herein. In specific implementation, the terminal device can discover the SPs or separate entities corresponding to the NPN through the same three methods as provided in scenario one. When an AS entity of the terminal device receives a system broadcast message, NAS signaling, or signature information that carries the information of the SP or the information of the separate entity, the AS layer entity forwards the received message to a NAS layer entity, and the NAS layer entity selects an SP or a separate entity to provide a service for the terminal device.

In some embodiments, when the NAS layer entity selects one SP or separate entity to provide a service for the terminal device, it can select a pre-configured SP or a pre-configured separate entity to provide a service for the terminal device. For instance, if the pre-configured separate entity is a separate entity 2, the terminal device selects the separate entity 2 to provide a service for the terminal device. The SP or separate entity equivalent to the pre-configured SP or pre-configured separate entity may also be selected to provide a service for the terminal device. For instance, if the pre-configured separate entity is a separate entity 3 and the separate entity 2 is equivalent to the separate entity 3, the terminal device selects the separate entity 2 to provide a service for the terminal device. One SP or separate entity may also be determined to provide a service for the terminal device according further to selection made by a terminal device user. For instance, if the terminal device user selects a separate entity 1, the terminal device determines that the separate entity 1 provides a service for the terminal device.

In some other embodiments, the NAS layer entity may also determine one SP or separate entity for providing a service according to the SP or separate entity allowed to be accessed by the terminal device. For instance, if the separate entity allowed to be accessed by the terminal device is the separate entity 1, the terminal device selects the separate entity 1 to provide a service for the terminal device.

An optional processing process of a network selection method applied in a network device provided by an embodiment of the disclosure is shown in FIG. 6, and the method includes the following steps.

In step S301, a network device sends a system broadcast message, non-access layer signaling, or signature information to a terminal device. The system broadcast message, the non-access layer signaling, or the signature information is configured for the terminal device to determine information of at least one service provider. The information of the service provider is used by the terminal device to determine a non-public network to reside in and/or a service provider for providing a service.

In some embodiments, the information of the service provider at least includes: a SID and/or readable name information of the service provider.

In some embodiments, the SID includes at least one or more of the following: a country or region code, an industry code, and a country or region assigned service provider code.

In some embodiments, the SID at least includes a non-public network identifier corresponding to the service provider.

In some embodiments, the non-access layer signaling at least includes: a terminal device registration acceptance message or a terminal device configuration update message.

Note that in various embodiments of the disclosure, the sizes of the sequence numbers of the foregoing processes do not mean the order of execution. The execution sequence of each process should be determined by its function and internal logic, and should not constitute any limitation to the implementation process of the embodiments of the disclosure.

In order to allow the foregoing network selection method to be implemented, a terminal device is provided in the embodiments of the disclosure. A composite structure of a terminal device 400 is shown in FIG. 7, and the terminal device 400 includes: a first processing unit 401.

The first processing unit 401 is configured to determine, from among at least one non-public network, a non-public network to reside in and to determine, from among at least one service provider, a service provider for providing a service.

In some embodiments, the terminal device further includes: a second processing unit 402 configured to determine information of the at least one service provider.

In some embodiments, the information of the service provider at least includes: a SID and/or readable name information of the service provider.

In some embodiments, the SID includes at least one or more of the following: a country or region code, an industry code, and a country or region assigned service provider code.

In some embodiments, the SID at least includes a non-public network identifier corresponding to the service provider.

In some embodiments, the second processing unit 402 is configured to execute at least one of the following operations.

Through a system broadcast message, the information of the at least one service provider is determined.

Through NAS signaling, the information of the at least one service provider is determined.

Through signature information of the terminal device, the information of the at least one service provider is determined.

In some embodiments, the NAS signaling at least includes: a terminal device registration acceptance message or a terminal device configuration update message.

In some embodiments, the signature information is sent by a network device on a non-public network, and the signature information carries information of a service provider that can be supported by the non-public network.

In some embodiments, the signature information is sent by the service provider, and the signature information carries information of a non-public network that can provide a service for the service provider.

In some embodiments, the first processing unit 401 is configured to determine, according to a non-public network allowed to be accessed by the terminal device, a non-public network to reside in.

In some embodiments, the first processing unit 401 is configured to determine, according to a service provider allowed to be accessed by the terminal device, a non-public network to reside in corresponding to the service provider allowed to be accessed.

In some embodiments, the first processing unit 401 is configured to determine, according to a service provider allowed to be accessed by the terminal device, a service provider for providing a service.

In some embodiments, the first processing unit 401 is configured to determine, from among the at least one service provider, a pre-configured service provider as the service provider for providing a service,
    is configured to determine, from among the at least one service provider, a service provider equivalent to the pre-configured service provider as the service provider for providing a service, or is configured to determine, among the at least one service provider, the service provider for providing a service according to selection of a terminal device user.

In order to allow the foregoing network selection method to be implemented, a network device is provided in the embodiments of the disclosure. A composite structure of a network device 500 is shown in FIG. 8, and the network device 500 includes: a sending unit 501.

The sending unit 501 is configured to send a system broadcast message, non-access layer signaling, or signature information to a terminal device. The system broadcast message, the non-access layer signaling, or the signature information is configured for the terminal device to determine information of at least one service provider. The information of the service provider is used by the terminal device to determine a non-public network to reside in and/or a service provider for providing a service.

In some embodiments, the information of the service provider at least includes: a SID and/or readable name information of the service provider.

In some embodiments, the SID includes at least one or more of the following: a country or region code, an industry code, and a country or region assigned service provider code.

In some embodiments, the SID at least includes a non-public network identifier corresponding to the service provider.

In some embodiments, the non-access layer signaling at least includes: a terminal device registration acceptance message or a terminal device configuration update message.

The embodiments of the disclosure further provide a terminal device including a processor and a memory configured for storing a computer program that can run on the processor. The processor is configured to perform the steps of the network selection method executed by the terminal device when running the computer program.

The embodiments of the disclosure further provide a network device including a processor and a memory configured for storing a computer program that can run on the processor. The processor is configured to perform the steps of the network selection method executed by the network device when running the computer program.

FIG. 9 is a schematic composite structure diagram of hardware of an electronic device (terminal device and network device) according to an embodiment of the disclosure. An electronic device 700 includes: at least one processor 701, a memory 702, and at least one network interface 704. The various components in the electronic device 700 are coupled together through a bus system 705. It may be understood that the bus system 705 is used to implement connection and communication among these components. Besides a data bus, the bus system 705 also includes a power bus, a control bus, and a status signal bus. However, for the sake of clear description, the various buses are marked as the bus system 705 in FIG. 9.

It may be understood that the memory 702 may be a volatile memory or a non-volatile memory and may also include both the volatile memory and non-volatile memory. The non-volatile memory may be a ROM, a programmable read-only memory (PROM), an erasable programmable read-only memory (EPROM), an electrically erasable programmable read-only memory (EEPROM), a ferromagnetic random access memory (FRAM), a flash memory, a magnetic surface memory, a compact disk, or a compact disc read-only memory (CD-ROM). The magnetic surface memory may be a magnetic disk storage or a magnetic tape storage. The volatile memory may be a random access memory (RAM) used as an external cache. By way of exemplary but not restrictive description, many forms of RAM are available, such as static random access memory (SRAM), synchronous static random access memory (SSRAM), dynamic random access memory (DRAM), synchronous dynamic random access memory (SDRAM), double data rate synchronous dynamic random access memory (DDRSDRAM), enhanced synchronous dynamic random access memory (ESDRAM), synclink dynamic random access memory (SLDRAM), or direct rambus random access memory (DRRAM). The memory 702 described in the embodiments of the disclosure is intended to include, but not limited to, these and any other suitable types of memories.

The memory 702 in the embodiments of the disclosure is used to store various types of data to support the operation of the electronic device 700. Examples of these data include: any computer program used to operate on the electronic device 700, such as an application program 7022. The program for implementing the method of the embodiments of the disclosure may be included in the application program 7022.

The method disclosed in the foregoing embodiments of the disclosure may be applied in the processor 701 or may be implemented by the processor 701. The processor 701 may be an integrated circuit chip with signal processing capabilities. In the implementation process, the steps of the foregoing method may be completed by an integrated logic circuit of hardware or a command in the form of software in the processor 701. The aforementioned processor 701 may be a general-purpose processor, a digital signal processor (DSP), or other components such as a programmable logic device, a discrete gate, a transistor logic device, a discrete hardware component, and the like. The processor 701 may implement or execute the various methods, steps, and logical block diagrams disclosed in the embodiments of the disclosure. The general-purpose processor may be a microprocessor or any conventional processor or the like. The steps of the method disclosed in the embodiments of the disclosure may be directly implemented as being executed and completed by a hardware decoding processor, or may be executed and completed by a combination of hardware and software modules in a decoding processor. The software module may be located in a storage medium, and the storage medium is located in the memory 702. The processor 701 reads the information in the memory 702 and completes the steps of the foregoing method in combination with its hardware.

In an exemplary embodiment, the electronic device 700 may be implemented by one or a plurality of application specific integrated circuits (ASICs), a DSP, programmable logic device (PLD), complex programmable logic device (CPLD), FPGA, general-purpose processor, controller, MCU, MPU, or other electronic components configured for performing the foregoing method.

The embodiments of the disclosure further provide a computer storage medium configured for storing an executable program.

Optionally, the computer storage medium may be applied to the terminal device in the embodiments of the disclosure, and the executable program causes the computer to execute the corresponding process in each method of the embodiments of the disclosure. For the sake of brevity, repeated description is not provided herein.

Optionally, the computer storage medium may be applied to the network device in the embodiments of the disclosure, and the executable program causes the computer to execute the corresponding process in each method of the embodiments of the disclosure. For the sake of brevity, repeated description is not provided herein.

The embodiments of the disclosure provide a chip including a processor configured to call and run a computer program from a memory, such that a device installed with the chip executes the network selection method executed by the terminal device or the network selection method executed by the network device.

The embodiments of the disclosure provide a computer program product including a computer program command, and the computer program command enables a computer to execute the network selection method executed by the terminal device or the network selection method executed by the network device.

The embodiments of the disclosure provide a computer program, and the computer program enables a computer to execute the network selection method executed by the terminal device or the network selection method executed by the network device.

The disclosure is described with reference to flow charts and/or block diagrams of methods, devices (systems), and computer program products according to the embodiments of the disclosure. It should be understood that each process and/or block in each flow chart and/or block diagram, and the combination of processes and/or blocks in the flow charts and/or block diagrams may be implemented by computer program commands. These computer program commands may be provided to the processor of a general-purpose computer, a special-purpose computer, an embedded processor, or other programmable data processing devices to produce a machine. In this way, the commands executed by the processor of the computer or other programmable data processing devices generate a device for implementing the functions specified in one or more processes in the flow chart and/or one or more blocks in the block diagram.

These computer program commands may also be stored in a computer-readable memory that may guide a computer or other programmable data processing devices to work in a specific manner. In this way, the commands stored in the computer-readable memory generate an article of manufacturing including the command device. The command device implements the functions specified in one or more processes in the flow chart and/or one or more blocks in the block diagram.

These computer program commands may also be loaded onto a computer or other programmable data processing devices, so that a series of operation steps may be executed on the computer or other programmable devices to generate processing of computer implementation. As such, the commands executed on the computer or other programmable devices provide steps for implementing the functions specified in one or more processes in the flow chart and/or one or more blocks in the block diagram.

The above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. A network selection method, comprising:
 receiving, by a terminal device, a system broadcast message, a non-access stratum (NAS) signaling, or signature information from a network device;
 determining, by the terminal device from among multiple non-public networks, a non-public network to reside in based on the system broadcast message, the NAS signaling, or the signature information, comprising:
  determining, by the terminal device according to a non-public network allowed to be accessed by the terminal device, a non-public network to reside in; and
 determining, by the terminal device from among multiple service providers corresponding to the non-public network for the terminal device to reside in, a service provider for providing a service based on the system broadcast message, the NAS signaling, or the signature information;
 wherein the method further comprises determining, by the terminal device, information of the multiple service providers, comprising:
  determining, by the terminal device through the system broadcast message, the information of the multiple service providers, wherein the information of the multiple service providers at least comprises a service provider identifier (SID) and readable name information of the multiple service providers, wherein the SID at least comprises a non-public network identifier corresponding to the multiple service providers;
 wherein the method further comprises determining, by the terminal device according to a service provider allowed to be accessed by the terminal device, the non-public network to reside in corresponding to the service provider allowed to be accessed.

2. The method according to claim 1, further comprising:
 determining, by the terminal device through the NAS signaling, the information of the multiple service providers; and
 determining, by the terminal device through the signature information of the terminal device, the information of the multiple service providers.

3. The method according to claim 1, comprising:
 determining, by the terminal device according to a service provider allowed to be accessed by the terminal device, the service provider for providing the service.

4. The method according to claim 1, wherein the SID at least comprises a non-public network identifier corresponding to the service provider.

5. The method according to claim 1, wherein the NAS signaling at least comprises:
 a terminal device registration acceptance message or a terminal device configuration update message.

6. The method according to claim 1, wherein the signature information is sent by a network device on a non-public network, and the signature information carries information of a service provider that can be supported by the non-public network.

7. The method according to claim 1, wherein the signature information is sent by the service provider, and the signature information carries information of a non-public network that can provide a service for the service provider.

8. A network selection method, comprising:
 sending, by a network device, a system broadcast message, non-access stratum (NAS) signaling, or signature information to a terminal device; wherein the system broadcast message, the NAS signaling, or the signature information is configured for the terminal device to determine information of multiple service providers, and the information of the service provider is used by the terminal device to determine, among multiple non-public networks corresponding to the non-public network to reside in, a non-public network to reside in and/or a service provider for providing a service, wherein the information of the multiple service providers at least comprises a service provider identifier (SID) and readable name information of the multiple service providers, and the SID at least comprises a non-public network identifier corresponding to the multiple service providers, wherein determine, among multiple non-public networks corresponding to the non-public network to reside in, the non-public network to reside in comprises:

determining, by the terminal device according to a non-public network allowed to be accessed by the terminal device, a non-public network to reside in;

wherein a service provider allowed to be accessed by the terminal device is used by the terminal device to determine the non-public network to reside in corresponding to the service provider allowed to be accessed.

9. The network selection method according to claim 8, wherein the SID at least comprises a non-public network identifier corresponding to the service provider.

10. The network selection method according to claim 8, wherein the NAS signaling at least comprises:

a terminal device registration acceptance message or a terminal device configuration update message.

11. The network selection method according to claim 8, wherein the signature information is sent by a network device on a non-public network, and the signature information carries information of a service provider that can be supported by the non-public network.

12. A terminal device, comprising:

a first processing unit, configured to:

receive a system broadcast message, a non-access stratum (NAS) signaling, or signature information from a network device;

determine, from among multiple non-public networks, a non-public network to reside in based on the system broadcast message, the NAS signaling, or the signature information, comprising:

determining according to a non-public network allowed to be accessed by the terminal device, a non-public network to reside in;

determine, from among multiple service providers corresponding to the non-public network for the terminal device to reside in, a service provider for providing a service;

a second processing unit, configured to:

determine information of the multiple service providers, comprising:

determining through the system broadcast message, the information of the multiple service providers, wherein the information of the multiple service providers at least comprises a service provider identifier (SID) and readable name information of the multiple service providers, wherein the SID at least comprises a non-public network identifier corresponding to the multiple service providers;

wherein the first processing unit is configured to determine, according to a service provider allowed to be accessed by the terminal device, the non-public network to reside in corresponding to the service provider allowed to be accessed.

13. The terminal device according to claim 12, wherein the second processing unit is further configured for:

determining, through the NAS signaling, the information of the multiple service providers; and determining, through the signature information of the terminal device, the information of the multiple service providers.

14. The terminal device according to claim 12, wherein the first processing unit is configured to determine, according to a service provider allowed to be accessed by the terminal device, the service provider for providing the service.

15. The terminal device according to claim 12, wherein the SID at least comprises a non-public network identifier corresponding to the service provider.

16. The terminal device according to claim 12, wherein the NAS signaling at least comprises:

a terminal device registration acceptance message or a terminal device configuration update message.

17. The terminal device according to claim 12, wherein the signature information is sent by a network device on a non-public network, and the signature information carries information of a service provider that can be supported by the non-public network.

18. The terminal device according to claim 12, wherein the signature information is sent by the service provider, and the signature information carries information of a non-public network that can provide a service for the service provider.

\* \* \* \* \*